United States Patent [19]
Ando et al.

[11] Patent Number: 6,118,121
[45] Date of Patent: *Sep. 12, 2000

[54] PROBE SCANNING MECHANISM FOR A SCANNING PROBE MICROSCOPE

[75] Inventors: Toshio Ando, Kanazawa; Yoshiaki Hayashi, Ome, both of Japan

[73] Assignee: Olympus Optical Co., Ltd., Tokyo, Japan

[ * ] Notice: This patent is subject to a terminal disclaimer.

[21] Appl. No.: 09/286,793

[22] Filed: Apr. 6, 1999

Related U.S. Application Data

[63] Continuation of application No. 08/713,731, Sep. 13, 1996, Pat. No. 5,912,461.

[30] Foreign Application Priority Data

Sep. 22, 1995 [JP] Japan ................................. 7-244131

[51] Int. Cl.[7] .................................................. G01N 13/12
[52] U.S. Cl. ..................................... 250/306; 250/442.11
[58] Field of Search ..................................... 250/306, 307, 250/442.11, 423 P

[56] References Cited

U.S. PATENT DOCUMENTS

| | | | |
|---|---|---|---|
| 4,188,118 | 2/1980 | Weinstein et al. | 250/442.11 |
| 5,103,095 | 4/1992 | Elings et al. | 250/442.11 |
| 5,223,713 | 6/1993 | Uozumi et al. | 250/442.11 |
| 5,286,977 | 2/1994 | Yokoyama et al. | 250/442.11 |
| 5,479,013 | 12/1995 | Forster et al. | 250/306 |
| 5,500,535 | 3/1996 | Jing | 250/306 |
| 5,569,918 | 10/1996 | Wang | 250/442.11 |
| 5,616,916 | 4/1997 | Handa et al. | 250/306 |
| 5,627,371 | 5/1997 | Griffith et al. | 250/306 |
| 5,656,769 | 8/1997 | Nazkano et al. | 250/306 |
| 5,811,802 | 9/1998 | Gamble | 250/306 |
| 5,847,383 | 12/1998 | Tong | 250/306 |
| 5,939,719 | 8/1999 | Park et al. | 250/306 |

*Primary Examiner*—Bruce C. Anderson
*Attorney, Agent, or Firm*—Frishauf, Holtz, Goodman, Langer & Chick, P.C.

[57] ABSTRACT

A cantilever is attached to a moving block by means of a holder. Three sapphire plates are provided at a corner of the moving block so that their respective planes extend at right angles to one another. Three piezo-actuators are displaceable in directions intersecting at right angles to one another, and fixed with their one ends to stationary tables, respectively. Sapphire plates are attached individually to the respective other ends of the piezo-actuators. Each sapphire plate faces its corresponding sapphire plate on the moving block with ruby spheres between them. Two attracting magnets are attached individually to the respective sapphire plates at the center. The magnets face each other with a narrow enough space of, e.g., several micrometers between them.

11 Claims, 3 Drawing Sheets

PROBE SCANNING MECHANISM FOR A SCANNING PROBE MICROSCOPE

This is a continuation of application Ser. No. 08/713,731, (now U.S. Pat. No. 5,912,461) filed Sep. 13, 1996.

BACKGROUND OF THE INVENTION

1. Field of the Invention

The present invention relates to a probe scanning mechanism for a scanning probe microscope capable of observing samples at a resolution of an atomic order.

2. Description of the Related Art

Scanning probe microscopes (SPMs) are conventionally known as apparatuses for observing samples at a resolution of an atomic order.

A scanning tunneling microscope (STM) invented by Binnig, Rohrer, et al. is one type of SPM, and an atomic force microscope (AFM) is another type of SPM. The AFM is an apparatus that utilizes the elemental technologies of the STMs, including servo technology, and can be used to observe insulating samples at a resolution of an atomic order.

The AFM is provided with a cantilever, which has a pointed projection (probe) on its free end. When the probe is brought close to a sample, the free end of the cantilever is displaced by an interactive force (atomic force) between the atoms of the distal end of the probe and those of the sample surface. Information relating to the irregularity of the sample surface and the like can be obtained in a three-dimensional fashion by scanning the probe with respect to the sample surface in the XY-direction, while measuring the displacement of the free end of the cantilever electrically or optically.

Available scanning mechanisms include an XY-stage, the so-called tripod, the so-called piezoelectric tube scanner, etc. The XY-stage comprises X- and Y-tables, which are movable at right angles to each other, and layer-built piezo-actuators for moving the tables. The tripod is formed of three layer-built piezo-actuators that are connected at right angles to one another. The piezoelectric tube scanner comprises a cylindrical piezoelectric element, a continuous common circumferential electrode on the inner surface of the tube, and four circumferentially divided driving electrodes on the outer surface of the tube.

The X-direction motion of the X-table and the Y-direction motion of the Y-table, in the XY-stage, are completely independent of each other, so that one of these motions cannot be influenced by the other. Since the inertial mass of each table is substantial, however, the XY-stage is not suited for high-speed scanning.

The tripod and the tube scanner can perform a scanning operation at a relatively high speed. Since a motion in one direction is dependent on a motion in another, however, the former inevitably influences the latter.

Thus, in the tripod and piezoelectric tube scanner, the scanning frequency is restricted to 300 Hz in consideration of the natural frequency of each piezo-actuator and ringing. In actual practice, the scanning frequency for the tube scanner is several tens of hertz at the most.

The above-mentioned ringing is the vibration that is left after the occurrence of the displacement when voltage applied to the piezo-actuators is increased suddenly. In order to obtain a great scanning width, the piezoelectric tube scanner requires a substantial overall length. The longer the scanner, however, the more easily the ringing occurs.

The above described scanning mechanisms can be used without any substantial hindrance in observing stationary samples or samples that slowly change with time. Since the scanning cycle is long, however, such scanning mechanisms cannot enable observation of the way phagocytes reach out their pseudopodia or cells react to stimuli, for example.

SUMMARY OF THE INVENTION

The object of the present invention is to provide a probe scanning mechanism in which motions in different directions are independent of each other, and a probe which can serve for high-speed scanning.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will now be described with reference to the accompanying drawings.

Figure 1:
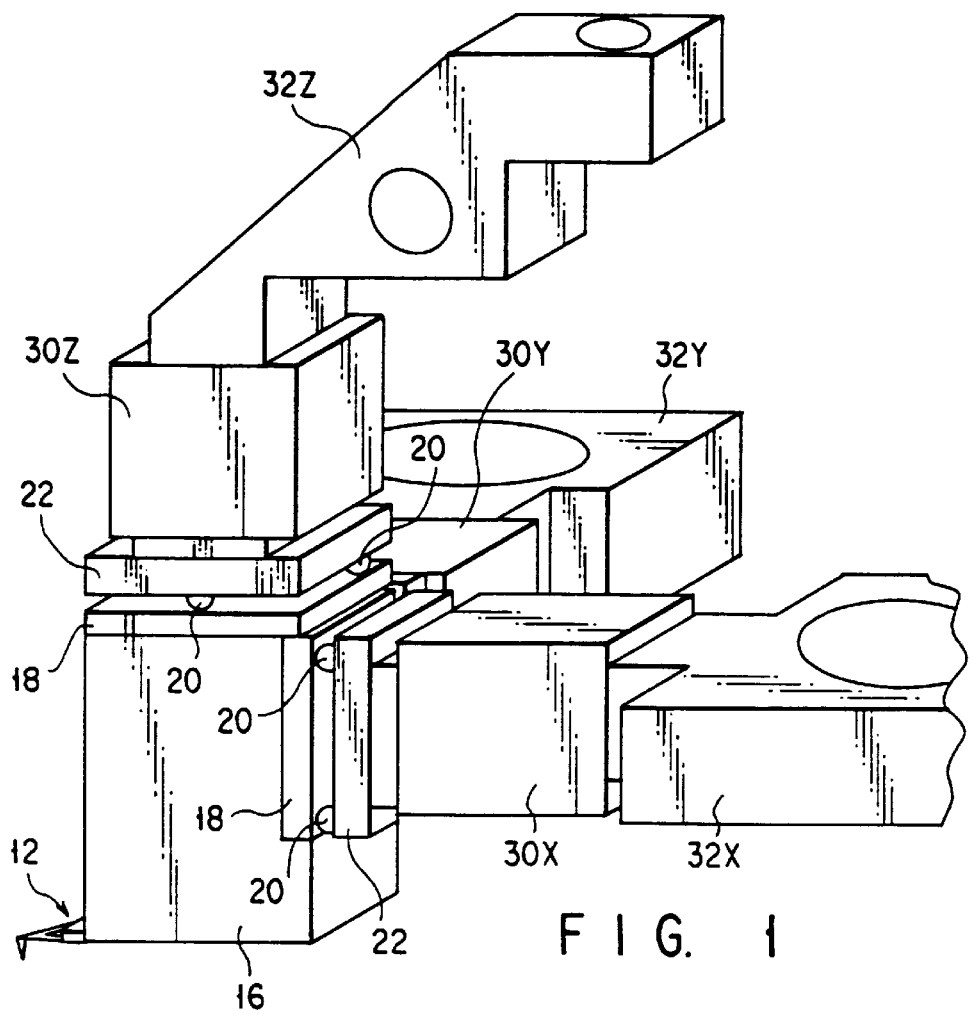
FIG. 1 is a perspective view showing an arrangement of a probe scanning mechanism according to an embodiment of the present invention.

Referring first to FIG. 1, an arrangement of a probe scanning mechanism will be described. A cantilever 12, which has a probe at its free end, is attached to a moving block 16 by means of a holder (denoted by reference numeral 14 in FIG. 5). Three sapphire plates 18 are provided at a corner of the moving block 16 so that their respective planes extend at right angles to one another. Three piezo-actuators 30X, 30Y and 30Z are displaceable in directions intersecting at right angles to one another, and fixed with their one ends to stationary tables 32X, 32Y and 32Z, respectively. Sapphire plates 22 are attached individually to the respective other ends of the piezo-actuators 30X, 30Y and 30Z. Each sapphire plate 22 faces its corresponding sapphire plate 18 on the moving block 16 with three ruby spheres 20 between them.

Figure 2:
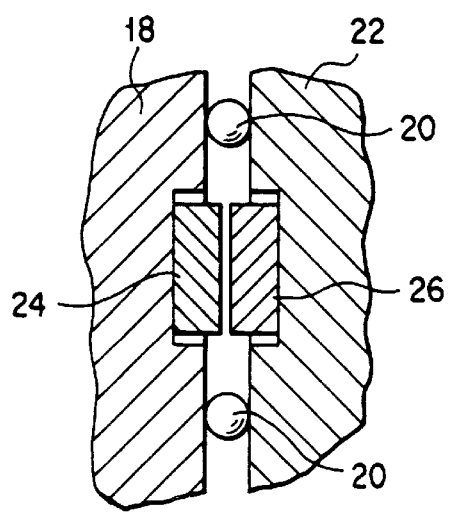
FIG. 2 shows an arrangement for supporting a moving block.

As shown in FIG. 2, a magnet 24 is attached to the sapphire plate 18 at the center, and a magnet 26 to the sapphire plate 22 at the center. The two magnets face each other with their opposed surfaces different in polarity so that they attract each other. A narrow enough space of, e.g., several micrometers is kept between the magnets. The magnet 24 has the magnetic flux density of about 12,500 gauss, and the magnet 26 has the same. The attraction between the magnets 24 and 26 maintains contact between the ruby spheres 20 and the sapphire plates 18 and 22, whereby the moving block 16 is supported by the three piezo-actuators 30X, 30Y and 30Z, as shown in FIG. 1. The sapphire plates 18 and 22 are provided with a mechanism (not shown) for preventing the ruby spheres 20 from slipping off.

The following is a description of the operation of the probe scanning mechanism. Let us first suppose a case in which only the piezo-actuator 30X for the X-direction is actuated with the piezo-actuators 30Y and 30Z for the Y- and Z-directions off so that the moving block 16 undergoes one-dimensional motions. Extension and contraction of the piezo-actuator 30X cause its corresponding sapphire plate 22 to reciprocate in the X-direction, and the reciprocation of the plate 22 causes the ruby spheres 20 to reciprocate the moving block 16 in the X-direction. During this reciprocation, those sapphire plates 18 which face in the Y- and Z-directions only move in the X-direction with respect to the sapphire plates 22 opposite thereto, accompanied with rotation of the ruby spheres 20, without displacement in the Y- and Z-directions. Accordingly, the Y- and Z-direction positions of the moving block 16 never change. These motions are opposed only by the very small rolling resistance of the ruby spheres 20 in the Y- and Z-directions.

Let us then suppose a case in which the three piezo-actuators 30X, 30Y and 30Z are actuated together so that the moving block 16 undergoes three-dimensional motions. Since motions of the moving block 16 in the Y- and Z-directions involve no X-direction components, the moving block 16 moves in quite the same manner as aforesaid with respect to the X-direction, and the piezo-actuator 30X drives the moving block 16 in the X-direction without influence by the piezo-actuators 30Y and 30Z. Thus, any one of the piezo-actuator drives the moving block 16 in its corresponding direction without any influence from the two other piezo-actuators.

Since the motions in the X-, Y- and Z-directions are thus completely independent of one another, the scanning frequency is settled depending only on the vibration characteristic for each corresponding direction. The frequency for actual scanning is lower than the resonant frequency, and the resonant frequency of the mechanism, which includes piezo-actuators 30X, 30Y and 30Z, moving block 16, cantilever 12, and cantilever holder 14, can be adjusted to 200 kHz or thereabout. Thus, the scanning can be carried out at a frequency of about 200 kHz.

For example, the moving block 16 is a 2.5-mm cube of quartz or glass having a mass of about 40 mg, each ruby sphere 20 has a diameter of 0.4 mm, and each piezo-actuator is a 2.5-mm cube having a stroke of 1.7 $\mu$m. Thus, the probe scanning mechanism has the maximum scanning range of 1.7 $\mu$m for any of the three directions, X-, Y- and Z-, and the resonant frequency of the mechanism is about 200 kHz. To realize the same scanning range with use of a scanning mechanism that includes a tube scanner, the scanner of 3-mm diameter requires a length of about 11 mm, and the resonant frequency of the scanning mechanism is about 30 kHz or less.

Figure 3:
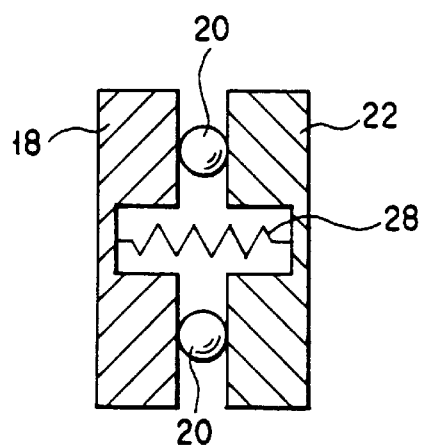
FIG. 3 shows another arrangement for supporting the moving block, which replaces the arrangement of FIG. 2.
Figure 4:
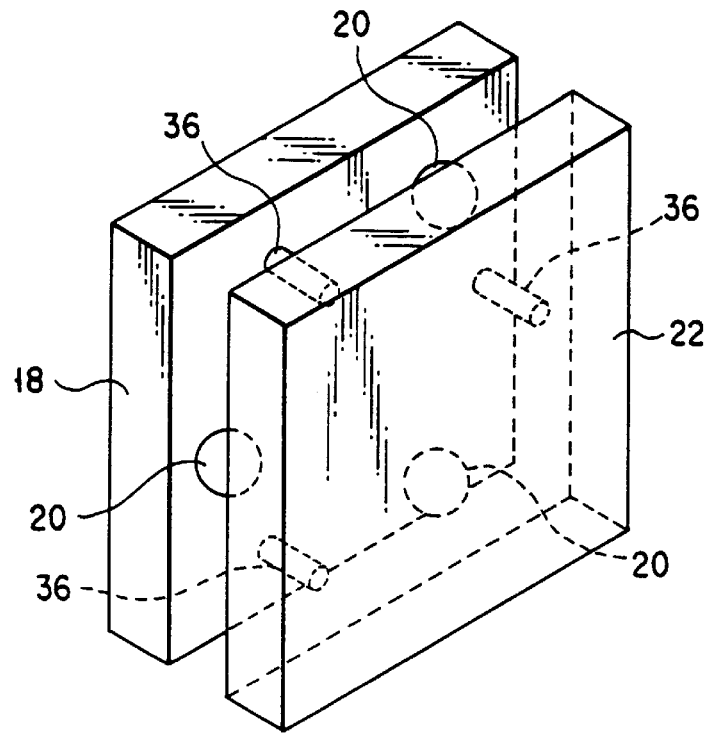
FIG. 4 shows still another arrangement for supporting the moving block, which replaces the arrangement of FIG. 2.

Although the magnets 24 and 26 are used as the means for maintaining the contact between the ruby spheres 20 and the sapphire plates 18 and 22 according to this embodiment, an elastic member may alternatively be used in a manner such that its opposite ends are connected individually to the sapphire plates 18 and 22. For example, the elastic member may be a coil spring 28, as shown in FIG. 3, or a rod-shaped member 36 of rubber, resin, or metal, as shown in FIG. 4.

Figure 5:
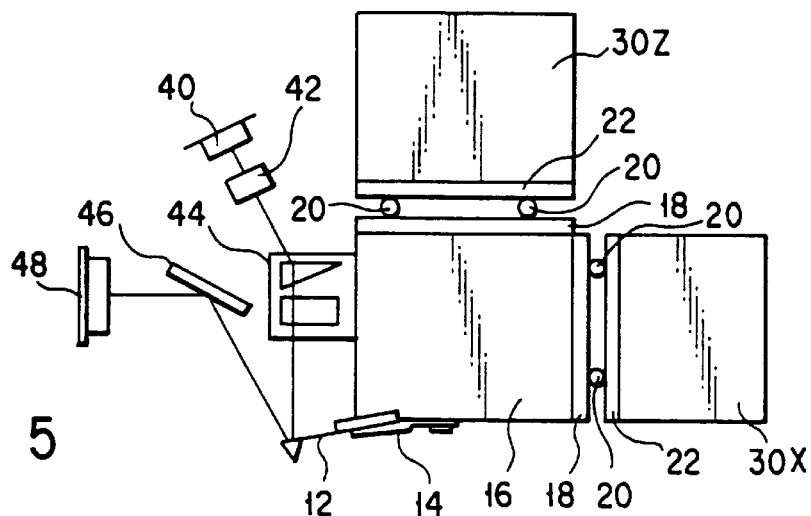
FIG. 5 shows an arrangement of an atomic force microscope using the probe scanning mechanism of FIG. 1.
Figure 6:
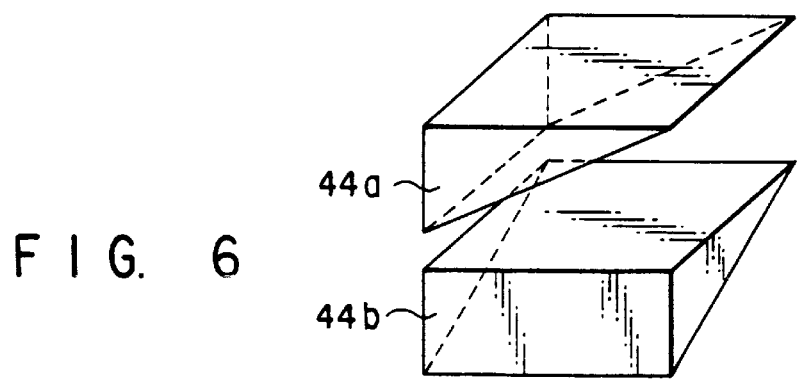
FIG. 6 shows an arrangement of a refractive prism shown in FIG. 5.

Referring then to FIGS. 5 and 6, an atomic force microscope (AFM) using the aforementioned probe scanning mechanism will be described.

Overlying the cantilever 12, as shown in FIG. 5, a refractive prism 44 is fixed to the moving block 16. As shown in FIG. 6, the prism 44 includes two triangular prisms 44a and 44b that are stacked in layers in the Z-direction with a phase difference of 90°.

Referring again to FIG. 5, a laser oscillator 40 for emitting a laser beam, an expander/collimator 42 for expanding or collimating the laser beam from the oscillator 40, a reflector 46 for deflecting reflected light from the cantilever 12, and an optical sensor 48 having quartered light sensing regions are shown, with the elements being arranged individually in position. These optical elements are fixed together to one casing (not shown).

As the piezo-actuators 30X, 30Y and 30Z are extended or contracted in the aforementioned manner, the cantilever 12 is moved in any desired direction. With the progress of scanning, the laser beam emitted from the laser oscillator 40 is transmitted through the expander/collimator 42, deflected by the refractive prism 44, and projected on the free end portion of the cantilever 12. The reflected light from the cantilever 12 is reflected by the reflector 46 to be incident upon the optical sensor 48. The position of incidence of the reflected light upon the sensor 48 changes depending on the displacement of the free end portion of the cantilever 12. Therefore, the displacement of the free end portion of the cantilever 12 can be obtained by determining the quantity of light incident upon the individual light sensing regions of the optical sensor 48.

While the position of incidence of the laser beam upon the refractive prism 44 changes as the prism 44 moves together with the moving block 16 during the scanning operation, the prism 44 compensates so that the laser beam is incident upon the same position on the free end portion of the cantilever 12.

In this AFM, the weight of the portion to be scanned can be restricted to a very small value. More specifically, the overall mass of a combined structure that includes the moving block 16, holder (leaf spring) 14, cantilever 12, and refractive prism 44 can be restricted to 1 gram or less. Thus, high-speed scanning can be enjoyed.

Moreover, in order to cause the cantilever 12 supported by the moving block 16 to simply run across a sample at high speed, only piezo-actuators 30X and 30Y may be used.

Figure 7:
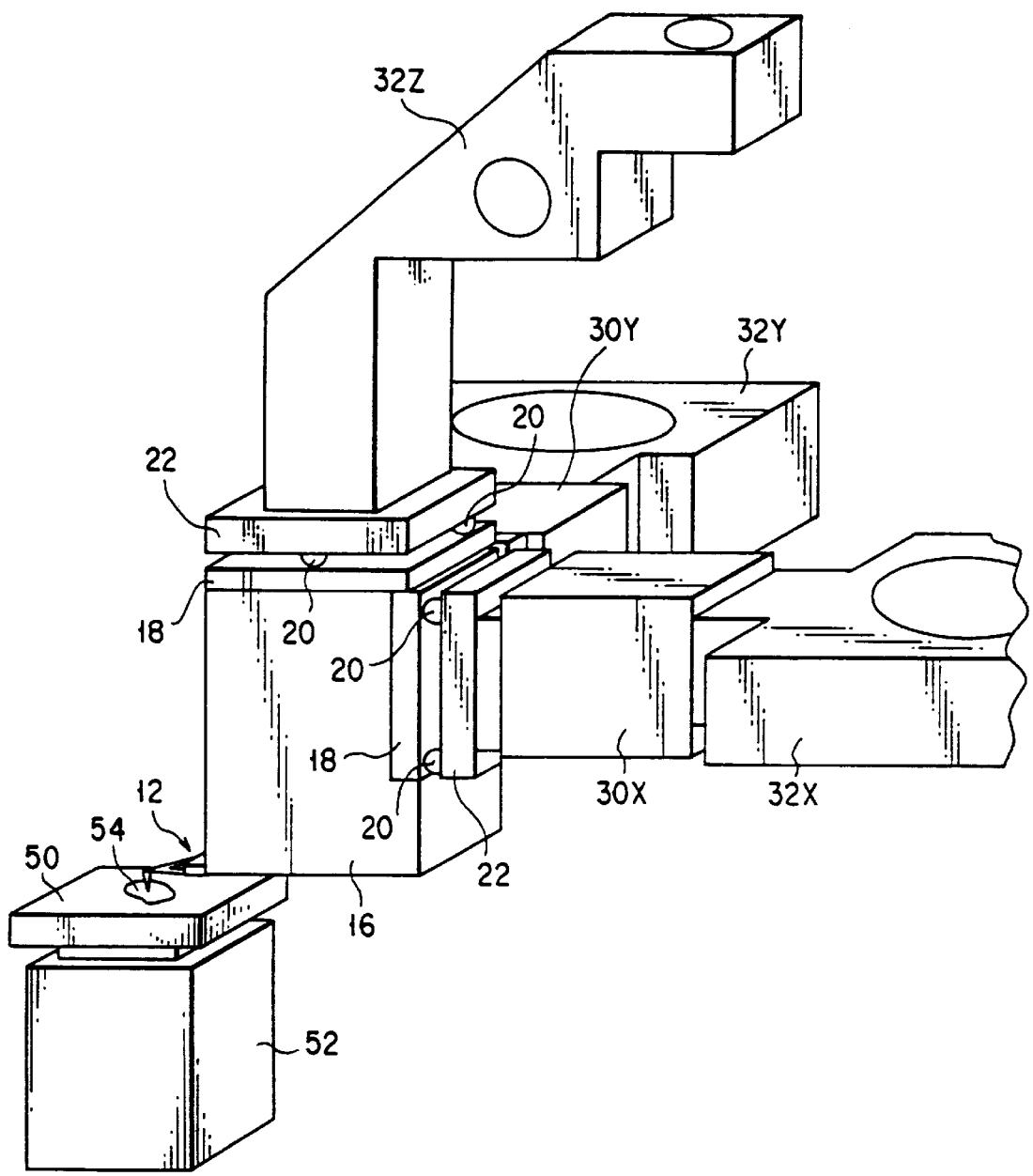
FIG. 7 shows another arrangement of a probe scanning mechanism according to another embodiment of the invention.

FIG. 7 shows such another embodiment of the present invention. The same reference numerals as FIG. 1 are added to the portions common to FIG. 1, and the detail explanation will be omitted. The following will explain the different points from FIG. 1.

In FIG. 7, the sapphire plate 22 is directly fixed to the stationary table 32Z. In other words, this figure shows the structure in which the piezo-actuator 30Z is omitted from the structure shown in FIG. 1. The Z-direction motion of the moving block 16 including the cantilever 12 is restrained.

A sample stage 50, on which an observing sample 54 is mounted, is located so that the sample 54 and the cantilever 12 face each other. The sample stage 50 is fixed to a piezo-actuator 52 for a Z-direction motion at its side opposite to a surface on which the sample 54 is mounted. The piezo-actuator 52 is structured to correspond to the piezo-actuator 30Z of FIG. 1.

The sample 54 may be directly placed on the stage 50. However, if the sample is a vital sample such as a cell, the vital sample is put in a Petri dish (not shown) filled with solution such as cell culture solution. Then, the Petri dish is mounted on the stage 50.

According to the above-explained structure, similar to the embodiment shown in FIG. 1, the motions of the piezo-actuators 30X and 30Y are completely independent of each other. The scanning frequency is settled depending only on the vibration characteristic for each corresponding direction. Thus, the scanning for the cantilever 12 can be carried out at a frequency of about 200 kHz. Moreover, the piezo-actuator for the Z-direction is formed on the sample side, thereby increasing rigidity of the apparatus formed at the side for supporting the cantilever 12 so as to improve the vibration of the apparatus.

The piezo-actuator 52 for a Z-direction motion is not restrained by the size of the other piezo-actuators 30X and 30Y, and the moving block 16. As a result, the degree of freedom of design can be expanded. Thus, there is obtained an apparatus which can obtain a large amount of displacement in the Z-direction, and which can deal with a sample whose surface has great roughness.

Additional advantages and modifications will readily occur to those skilled in the art. Therefore, the invention in its broader aspect is not limited to the specific details and representative devices shown and described herein. Accordingly, various modifications may be made without departing from the spirit or scope of the general inventive concept as defined by the appended claims and their equivalents.

What is claimed is:

1. A probe scanning mechanism for a scanning probe microscope, comprising:
    a lever portion having a probe;
    a moving block having a lever holding portion for holding the lever portion;
    a first actuator, coupled to the moving block, for moving the moving block in a direction of a first axis;
    a second actuator, coupled to the moving block, for moving the moving block in a direction of a second axis which is perpendicular to the direction of the first axis;
    a light source for emitting light toward the lever portion;
    a detector for detecting light reflected from the lever portion; and
    an optical unit, fixed to the moving block, for guiding the light emitted from the light source to be incident upon substantially a same position on the lever portion at all times;
    wherein at least one of the light source and the detector are disposed separately from the optical unit and from the moving block.

2. A probe scanning mechanism according to claim 1, wherein the optical unit comprises two refractive prisms stacked in layers in a direction perpendicular to the first and second axes with a phase difference of 90°.

3. A probe scanning mechanism according to claim 1, further comprising a third actuator, coupled to the moving block, for moving the moving block in a direction of a third axis which is perpendicular to the directions of the first and second axes.

4. A probe scanning mechanism according to claim 1, further comprising a reflecting mirror arranged in an optical path extending from the light source to the detector by way of the lever portion, said reflecting mirror being located between the lever portion and the detector for directing the light reflected from the lever portion to the detector.

5. A probe scanning mechanism according to claim 4, further comprising an optical element arranged in an optical path extending from the light source to the detector by way of the lever portion, said optical element being located between the light source and the optical unit for expanding the light emitted from the light source.

6. A probe scanning mechanism according to claim 4, further comprising an optical element arranged in an optical path extending from the light source to the detector by way of the lever portion, said optical element being located between the light source and the optical unit for collimating the light emitted from the light source.

7. A probe scanning mechanism according to claim 1, further comprising:
    a first supporting member coupled to the moving block such that the moving block is movable relative to the first actuator in any direction perpendicular to the direction of the first axis when the second actuator moves the moving block in the direction of the second axis; and
    a second supporting member coupled to the moving block such that the moving block is movable relative to the second actuator in any direction perpendicular to the direction of the second axis when the first actuator moves the moving block in the direction of the first axis.

8. A probe scanning mechanism according to claim 7, further comprising a third actuator, coupled to the moving block, for moving the moving block in a direction of a third axis which is perpendicular to the directions of the first and second axes, and a third supporting member coupled to the moving block such that the moving block is movable relative to the third actuator in any direction perpendicular to the direction of the third axis when at least one of the first and second actuators moves the moving block.

9. A probe scanning mechanism according to claim 8, wherein each of the supporting members comprises a pair of sapphire plates, a first one of which is fixed to the moving block and a second one of which is fixed to a corresponding actuator, a plurality of ruby spheres positioned between the pair of the sapphire plates, and a pair of magnets, fixed to the pair of sapphire plates, for maintaining contact between the ruby spheres and the sapphire plates.

10. A probe scanning mechanism according to claim 8, wherein each of the supporting members comprises a pair of sapphire plates, a first one of which is fixed to the moving block and a second one of which is fixed to a corresponding actuator, a plurality of ruby spheres positioned between the pair of the sapphire plates, and at least one coil spring, fixed to the pair of sapphire plates, for maintaining contact between the ruby spheres and the sapphire plates.

11. A probe scanning mechanism according to claim 8, wherein each of the supporting members comprises a pair of sapphire plates, a first one of which is fixed to the moving block and a second one of which is fixed to a corresponding actuator, a plurality of ruby spheres positioned between the pair of the sapphire plates, and a plurality of rod-shaped rubber members, fixed to the pair of sapphire plates, for maintaining contact between the ruby sphere and the sapphire plates.

* * * * *

UNITED STATES PATENT AND TRADEMARK OFFICE
CERTIFICATE OF CORRECTION

PATENT NO. : 6,118,121
DATED : September 12, 2000
INVENTOR(S) : Toshio ANDO et al.

It is certified that error appears in the above-indentified patent and that said Letters Patent is hereby corrected as shown below:

Item [56] References Cited, under "U.S. PATENT DOCUMENTS",
line 10, change "Na<u>z</u>kano et al."
to --Nakano et al.--.

Signed and Sealed this

Eighth Day of May, 2001

Attest:

NICHOLAS P. GODICI

*Attesting Officer*    *Acting Director of the United States Patent and Trademark Office*